June 7, 1966 L. HORNBOSTEL, JR 3,254,772
FILTER
Filed Nov. 13, 1962 2 Sheets-Sheet 1
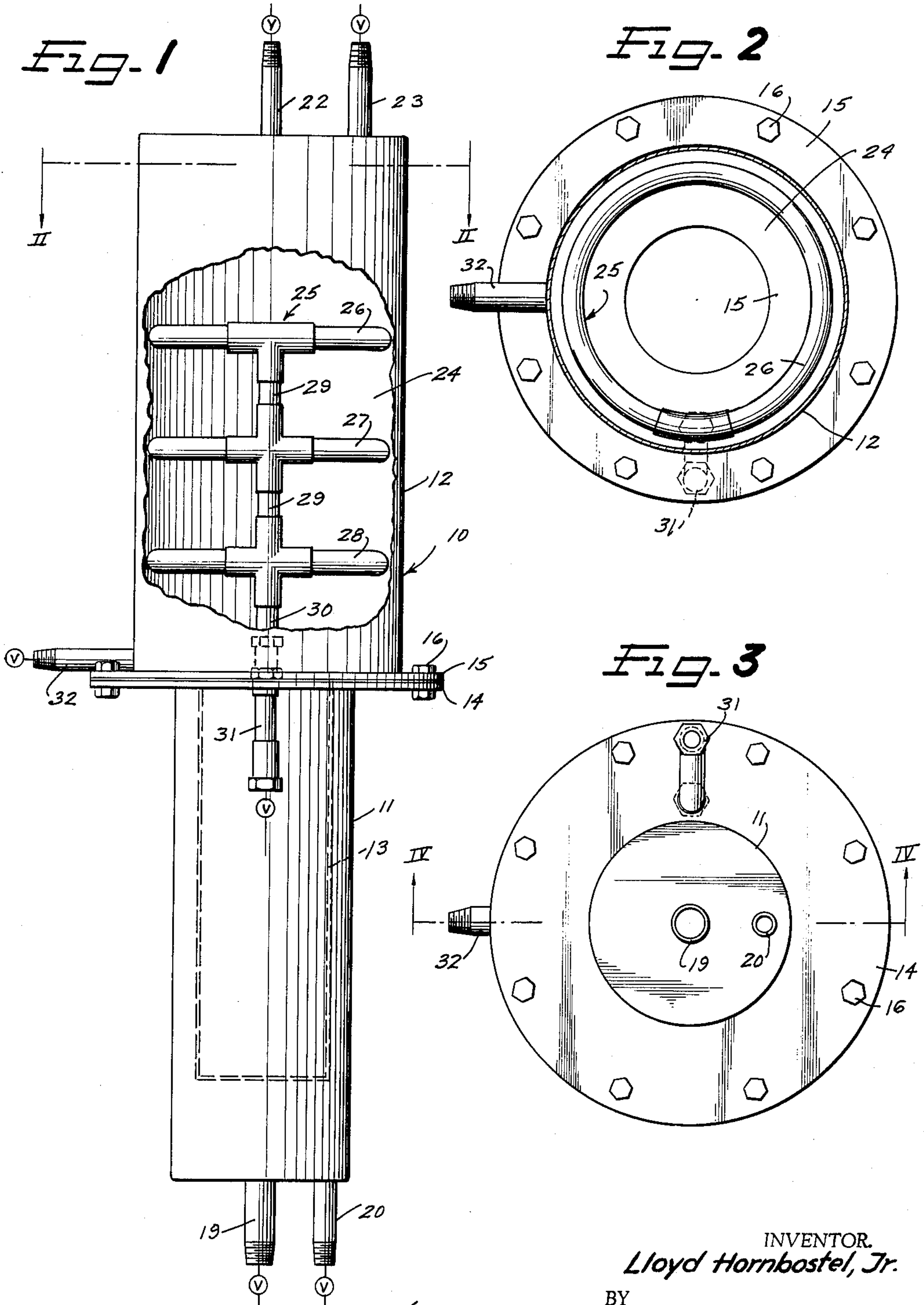

FILTER
Filed Nov. 13, 1962 2 Sheets-Sheet 2
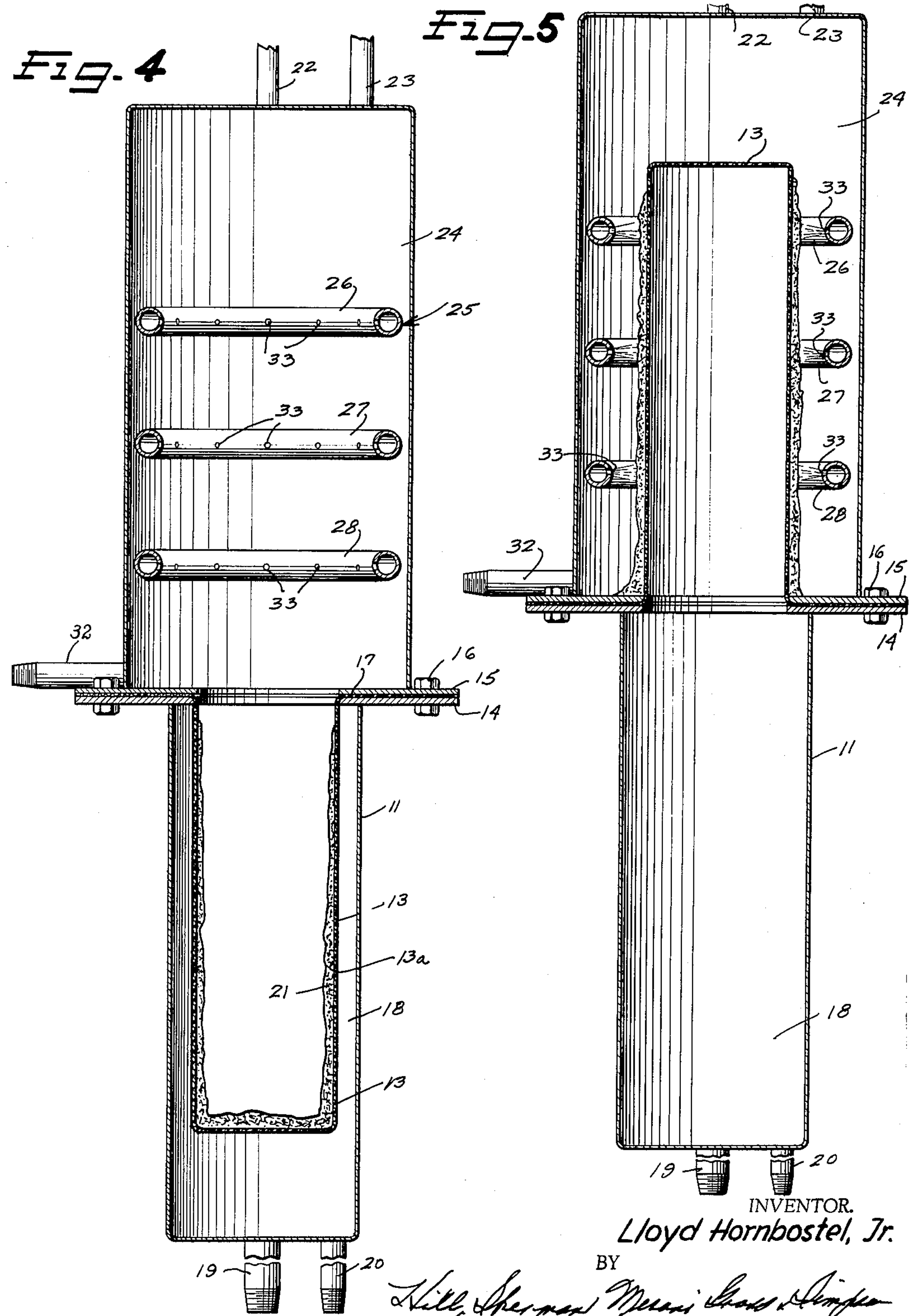
INVENTOR.
Lloyd Hornbostel, Jr.
BY
Hill, Sherman, Meroni, Gross & Simpson
ATTORNEYS

United States Patent Office 3,254,772
Patented June 7, 1966

1

3,254,772

FILTER

Lloyd Hornbostel, Jr., Beloit, Wis., assignor to Beloit Corporation, Beloit, Wis., a corporation of Wisconsin Filed Nov. 13, 1962, Ser. No. 237,132
1 Claim. (Cl. 210—408)

The present invention relates to improvements in filters and more particularly to a filter mechanism wherein fluids can be continuously filtered and the filtering members periodically cleaned.

In various fields the filtration of the fluid being processed requires substantially continuous filtering operation for removing particles from a fluid flow. In the paper-making industry this type of filtering process is required in the polishing (fine filtration) of paper mill white water. Other fields require filtration of fluids at relatively low pressures such as filtration of food abstracts including cider, liquors, grapes or mashes, and it is a primary object of the present invention to provide an improved continuous flow filter particularly well adapted for the filtration of fluids at relatively low pressures such as for the above uses.

Another object of the invention is to provide an improved filter of filtering wherein a porous tubular filter element of relatively simple construction may be employed for the filtering operation and wherein the filtering element can be simply and quickly cleaned for the removal of foreign materials removed from the filtrate.

A further object of the invention is to provide a filtering mechanism with an improved and simplified arrangement for washing and filtering element of particles removed from the filtrate.

A feature of the invention is the provision of the filter embodying a porous tubular filter element across which a pressure differential is maintained in a first filtering position during filtering operation and wherein the pressure differential is reversed so as to invert or turn inside out the tubular filter element into a second back washing position in which the solids removed from the filtrate are washed from the filter element by means of a plurality of annular showers positioned for washing operation in the second back washing position.

Other objects, advantages and features will become more apparent with the teaching of the principles of the present invention in connection with the disclosure of the preferred embodiment thereof in the specification, claim and drawings in which:

FIGURE 1 is an elevational view with parts broken away of a filter constructed for operation in accordance with principles of the present invention;

FIGURE 2 is a sectional view taken substantially along line II—II of FIGURE 1;

FIGURE 3 is a bottom plan view of the filtering mechanism of FIGURE 1;

FIGURE 4 is a sectional view taken substantially along line IV—IV of FIGURE 3; and FIGURE 5 is a sectional view similar to FIGURE 4 but showing the filter element in the second back washing position, whereas in FIGURE 4 the element is shown in the first filtering position.

On the drawings:

FIGURES 1–5 illustrate a filtering mechanism enclosed in a housing 10. The housing is comprised of a first hollow lower shell 11 and a second hollow upper shell 12, each of the shells being substantially cylindrical in shape and being closed at their outer ends with their inner open ends facing and clamped together to form a hollow chamber within the housing.

Filtering of fluid is accomplished by a hollow elongated tubular porous filter bag 13. The filter bag is formed of a flexible material for filtering the particular fluid to be fil-

2 tered. As an example the filter bag is formed of a material known to the trade as Albany Felt #800-B nylon. This type of material is a preferred structure for the filtration of food extracts because the filter material is strong and meets the requirements of the food industry (FDA). The inside of the filter bag may be pre-coated with a coating of bentonite to improve the clarity of the filtrate.

The lower shell 11 and the upper shell 12 each have radially outwardly extending flanges 14 and 15 at their open ends and the flanges are clamped together such as by circumferentially spaced bolts 16. The upper end of the filter bag 13 is turned outwardly and clamped between the flanges 14 and 15 for supporting the bag, and the bag thus forms a gasket between the shells 11 and 12.

The hollow lower shell forms a cylindrical chamber therein 18 of sufficient diameter to contain the filter bag 13 without it touching the walls of the shell so that fluids being filtered flow through the bag and downwardly through a filtrate outlet 19. Solids filtered from the fluid collect in a layer 21 within the filter bag 13. Provisions are made for reversing or turning the bag 13 inside out and moving it from its first filtering position, as shown in FIGURE 4, to its second back washing position, as shown in FIGURE 5. In normal operation fluid flows through the bag due to the pressure differential across the bag surface which may be created by vacuum applied to the filtrate outlet 19. This pressure differential is fundamental in determining the filtering rate. As the particles or sludge build up inside the filter bag in the layer 21 the pressure differential will increase since the applied vacuum will remain constant. When the pressure differential reaches a pre-determined maximum the filter bag 13 will be cleaned by being moved up to the second position of FIGURE 5. This may be done by directing air pressure into the lower shell 11 through a fitting 20.

Fluid to be filtered flows into the upper shell 12 through a fluid inlet 22. The upper shell is provided with another opening 23 which acts as a bleed line and which is opened when the filter bag is moved to its back washing position of FIGURE 5. For back washing a sludge removel line 32 is also opened for draining back washing water and sludge. Suitable valves shown schematically are provided for the air line 22, the bleed line 23, and the sludge removal line 32.

For washing the layer 21 of sludge from the filter bag 13 a cleansing and washing shower 25 is provided. The shower in shown in the form of annular spray rings 26, 27 and 28 which have inwardly directed spray orifices 33 arranged around the inner surface of the shower or washing rings. The arrangement is shown with three rings although additional washing rings may be provided and washing means may be positioned above the bag if desired.

Washing liquid, preferably in the form of water is supplied to the rings 26, 27, and 28 through a water inlet line 31 which extends through the flange 14 of the lower shell and is supported thereon and connects to an inlet 30 leading to the rings. The rings are interconnected by coupling lines 29 so that water flows simultaneously to each of the rings. The lower shell 11 is formed of a smaller diameter than the upper shell 12 inasmuch as the upper shell must accommodate the washing rings in a position coaxial with and outside of the filter bag in its second position.

In summary, during normal filtering operation fluid to be filtered flows into the housing 10 through a fluid inlet line 22 and filters through the bag 13 due to the pressure differential thereacross such as caused by applying a vacuum to the line 19, which drains the filtrate from the housing. When a layer 21 of sludge builds up so as to increase the pressure differential across the bag material to a degree so that insufficient filtrate flow results, the bag is moved up to the second position of FIGURE 5 and washed. The sludge drain line 32 is opened and the water supply line 31 is supplied with water so that the spray rings 25 begin operation. Air pressure is then directed into the line 20 so that the bag moves upwardly and spraying will occur while it is being inverted and while the sludge particles are being broken from the flexible bag surface, thus reducing the cleansing time and improving the cleansing operation. The inlet line 22 will of course have been shut off and the upper chamber 24 of the upper shell 12 will have been drained through the sludge drain line 32 and the filtrate drain line 19 will also have been closed as to permit inversion of the bag 13. Washing will continue until the bag is cleansed. The air pressure admitted into fitting 20 pressurized the inside of the reversed bag, holding it rigid, the air tending to flow outwardly through the bag will help break off the sludge and help clean the filter. Then the normal operation will be resumed by closing the air line 20, the bleed line 23, and the sludge removal line 32, and by opening the fluid inlet line 22 and the filtrate drain line 19. The filter bag will then be moved down to its lower filtering position when a vacuum is applied to the line 19. As will be appreciated the fluid may be directed into the filter under pressure through line 22.

Thus it will be seen that I have provided an improved filtering mechanism which meets the above advantages, objectives, and features and which provides for continuous filtering operation between back washing operations and accommodate rapid and complete cleansing of the filter bag during back washing.

The arrangement generally provides a porous hollow tubular filter element or bag with a first filter position for receiving a flow of fluid and collecting solids on the inner surface of the bag, and having a cleansing or back washing second position wherein the element is reversed while back washing fluid is applied and the sludge collected on the bag is broken free of the flexible bag.

The drawings and specification present a detailed disclosure of the preferred embodiments of the invention, and it is to be understood that the invention is not limited to the specific forms disclosed, but covers all modifications, changes and alternative constructions falling within the scope of the principles taught by the invention.

I claim as my invention:

A filter mechanism comprising, an elongated tubular hollow bag-like filter element or flexible material having a first filter position for receiving a flow of fluid into the element for collecting solids on the inner surface of the element, and having a second cleansing position wherein the element is turned inside out and said inner surface is exposed for cleansing the element, a housing forming a chamber therein and including a first hollow shell forming a first chamber portion having an open end and a closed end, and a second hollow shell of larger diameter than said first hollow shell forming a second chamber portion having an open end and a closed end, the edge material of the open end of said element clamped between and in direct physical contact with both said shells so that the closed end projects into the first chamber portion with the closed end of said element adjacent the closed end of said first shell in said first position and into the second chamber portion with the closed end of said element adjacent the closed end of said second shell in said second position, a fluid inlet into said second hollow shell, a filtrate outlet opening from said first hollow shell, a reversing fluid inlet in said first shell closed end and spaced from said filtrate outlet for forcing the filter element into said second cleansing position extending into said second shell, a bleed opening in the closed end of said second shell and spaced from said fluid inlet and for maintaining the filter element rigid and to permit movement of the element into said first shell, a plurality of hollow annular rings coaxial within said second shell and having inwardly directed water jets to apply a direct spray of liquid at the exposed surface of the element when it projects into said second shell, and a sludge removal outlet adjacent an edge of said second shell and spaced from said fluid inlet into said second shell and said bleed opening for carrying away washing water and solids removed from the element.

References Cited by the Examiner

UNITED STATES PATENTS

| | | | |
|---|---|---|---|
| 1,696,313 | 12/1928 | Liddell | 210—356 |
| 1,864,622 | 6/1932 | Sutherland | 55—293 X |
| 2,271,814 | 2/1942 | Coolidge | 210—411 X |
| 2,395,499 | 2/1946 | Oliver et al. | 210—393 |
| 2,404,358 | 7/1946 | Bible | 55—293 |
| 2,423,172 | 7/1947 | Booth | 210—411 X |
| 2,484,304 | 10/1949 | Long et al. | 210—82 X |
| 2,538,575 | 1/1951 | Kracklauer | 210—409 X |
| 2,570,132 | 10/1951 | Koupal | 210—410 |
| 2,598,606 | 5/1952 | Robinson | 210—393 X |
| 2,710,099 | 6/1955 | Kalinske | 210—410 |
| 2,732,948 | 1/1956 | Koupal et al. | 210—356 X |
| 2,795,291 | 6/1957 | Pierce | 55—293 X |
| 2,821,262 | 1/1958 | Godwin | 55—361 X |
| 2,862,622 | 12/1958 | Kircher et al. | 210—411 X |
| 3,100,190 | 8/1963 | Hobson | 210—409 X |
| 3,152,986 | 10/1964 | Bice et al. | 210—393 |

FOREIGN PATENTS

| | | |
|---|---|---|
| 62,908 | 7/1913 | Austria. |
| 628,493 | 4/1936 | Germany. |
| 791,510 | 3/1958 | Great Britain. |
| 335,506 | 2/1936 | Italy. |
| 351,308 | 8/1937 | Italy. |
| 319,205 | 3/1957 | Switzerland. |

REUBEN FRIEDMAN, *Primary Examiner.*

ROBERT F. BURNETT, *Examiner.*

D. E. TALBERT, JR., *Assistant Examiner.*